Patented May 24, 1927.

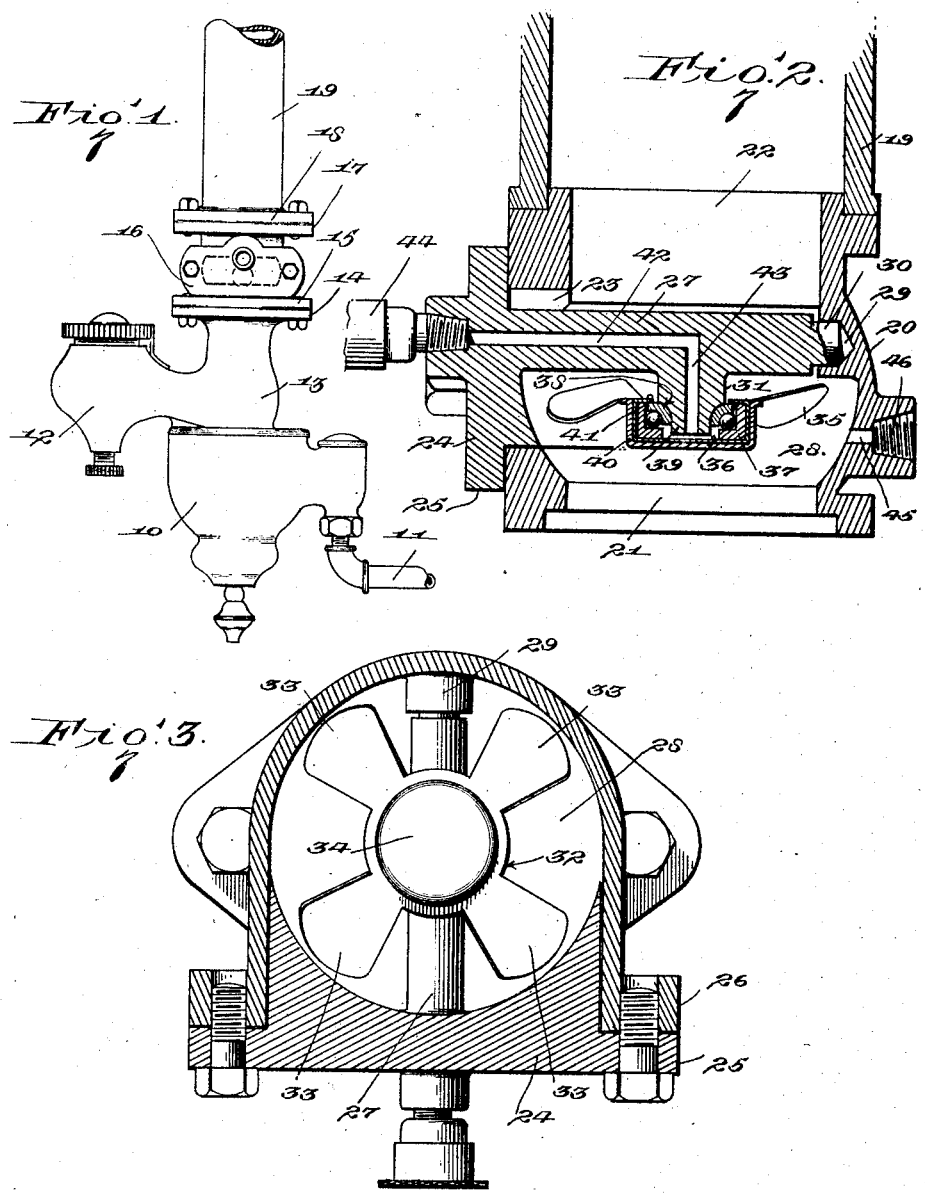

1,630,161

UNITED STATES PATENT OFFICE.

HENRY BORNHEIM, OF BOSTON, MASSACHUSETTS.

FUEL MIXER.

Application filed May 26, 1925. Serial No. 32,985.

This invention relates to mixers for the combustion mixture formed by a carbureter.

An object of the invention is the provision of a device for forming a more intimate and homogeneous mixture of the elements providing the fuel for an internal combustion engine and includes a fan disposed across the path of the moving fuel for churning the combustible mixture and an auxiliary air supply for directed air upon the fan in a plane in which the fan is disposed.

A further object of the invention is the provision of a device in which a fan is removably mounted in and diametrically of a casing forming part of the intake manifold, the fan being driven by the rush of fuel through the blades and beating the liquid particles of the fuel into a fine mist which is readily intermingled with the incoming air to form a more intimate mixture.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1 is a view in elevation of a carbureter and intake manifold showing my invention applied thereto.

Figure 2 is a vertical section of the mixer.

Figure 3 is a horizontal section of the mixer.

Referring more particularly to the drawings, 10 designates a carbureter of any approved type having a fuel conduit 11 and a primary air supply 12 and a conduit 13 forming a mixing bowl. The upper end of the bowl is flanged at 14 to which is connected a flange 15 of the mixer generally designated by the numeral 16. The mixer has a flange 17 which is connected to a flange 18 of the intake manifold 19.

The mixer is included in a casing 20 forming a section of the intake manifold and has an opening 21 in communication with the mixing bowl 13 and an opposite opening 22 leading to the intake manifold. An opening 23 is provided in the side wall of the casing in which is inserted a plug 24 for closing said opening. A flange 25 forming on the outer end of the plug not only aids in sealing the opening but provides an enlarged section whereby the plug may be bolted to the perforated ears 26 provided on the casing 20.

A bar 27 formed integrally with the plug 24 extends diametrically across the chamber 28 in the casing and has its free end received by a bearing 29 in the portion of the wall of said chamber which is directly opposite the opening 23. The end 30 of the bar is reduced in diameter to fit the bearing 29. Projecting downwardly from the central portion of the bar 27 is a boss 31.

A fan 32 is mounted on the boss 31 disposed in a horizontal plane and which plane is at a right angle to the longitudinal axis of the casing 20. The fan is provided with radial blades 33 carried by a cup shaped hub 34. The blades are turned at an angle as shown at 35 so that when the fuel is drawn through the casing by the suction stroke of an engine, the fan is revolved.

A cup shaped member 36 provides a casing for a ball bearing composed of an outer race 37 an inner race 38 sweated on a reduced end 39 of the boss 31 and a series of balls 40. The fan is supported on the boss 31 by a flange 41 on the upper open end of the cup shaped member 36 resting on the inner race 38.

The bar 27 is provided with a longitudinal passage 42 which is in communication with a passage 43 in the boss 31. The passages feed the bearing in the hub of the fan with lubricant from a grease cup 44 screwed into threaded outer end of the passage 42.

An air passage 45 is provided in the wall of the casing 20 and substantially in line with the plane of the fan 32 so that auxiliary air is supplied directed at a point in the casing where the air will be churned into an intimate mixture with the fuel issuing from the carbureter. An air valve of any approved type is adapted to be screwed into the threaded passage 46 which is at the outer end of the air vent 45.

When the fan is revolved by the current of combustible mixture, the blades not only beat the liquid particles into a fine mist and simultaneously churns the air and mist into an intimate mixture of fuel but also spread the heavier particles of fuel in a thin film on the blades which is picked upon by the whirling air. The auxiliary air is drawn directly into the blades by reason of the position of the air passage 45 and likewise churned into the mixture so that the fuel when it reaches the engine is in a condition for the most efficient operation of the said engine.

While I have shown the fuel mixer as a separate casting and connected between the carbureter and the intake pipe 19 it will be appreciated that the mixer may be cast integrally with the carbureter.

I claim:

1. A fuel mixer comprising a casing forming a section of an intake manifold having an opening in its wall, a fan support insertable through the opening and having a flanged portion forming a closure for the opening, a boss depending from the support and a fan mounted for rotation on the boss and means for supplying auxiliary air to the interior of the casing adjacent the fan.

2. A fuel mixer comprising a casing forming a section of an intake manifold having an opening in the wall thereof, a fan support consisting of a plug to close the opening, a bar projecting inwardly from the plug and transversely of the interior of the casing, a bearing on the inner wall of the casing to receive the free end of the bar, a boss projecting from the bar and a fan provided with a hub rotatably mounted on the hub.

3. A fuel mixer comprising a casing forming a section of an intake manifold having an opening in the wall thereof, a fan support consisting of a plug to close the opening a bar projecting inwardly from the plug and transversely of the interior of the casing, a bearing on the inner wall of the casing to receive the free end of the bar, a boss on the bar having a reduced end, a ball bearing on the reduced end of the boss, and a fan supported on the ball bearing.

4. A fuel mixer comprising a casing, a plug removably mounted transversely of the casing, a fan mounted in a plane at an angle to the horizontal axis of the casing and carried by the plug, means for directing an auxiliary stream of air in a line which is substantially in a plane of the fan, and opposite the removable plug.

5. A fuel mixer comprising a casing forming a section of an intake manifold having an opening in the wall thereof, a fan support consisting of a plug to fill the opening and including a bar projecting inwardly from the plug and transversely of the interior of the casing, a bearing on the inner wall of the casing to receive the free end of the bar and a fan rotatably supported by the bar in a plane which is at one side of the bar, and means for supplying a stream of air transversely to the longitudinal axis of the casing and in advance of the fan whereby the air is readily drawn into the blades of the fan.

6. A fuel mixer comprising a casing, a bar mounted transversely of the casing, a fan rotatably mounted on the bar and transversely of the casing, said fan including blades and a cup shaped hub stamped from a single sheet of material, said bar being provided with a bearing to receive the hub of the fan, means for directing a stream of air transversely of the casing and towards the hub, the cup-shaped hub spreading and directing the stream of air towards the blades.

HENRY BORNHEIM.